United States Patent [19]

Hill et al.

[11] Patent Number: 5,154,080

[45] Date of Patent: Oct. 13, 1992

[54] INTEGRATED CHECK VALVE TESTING SYSTEM

[75] Inventors: Gary L. Hill, Cobb County; Charles A. Burton, Whitfield County; Steven Nafziger, Dekalb County; John A. McMennamy, Cobb County, all of Ga.

[73] Assignee: Westinghouse Electric Corp., Pittsburgh, Pa.

[21] Appl. No.: 756,100

[22] Filed: Sep. 6, 1991

Related U.S. Application Data

[63] Continuation-in-part of Ser. No. 597,441, Oct. 15, 1990, abandoned, which is a continuation of Ser. No. 467,911, Jan. 22, 1990, Pat. No. 4,977,778, which is a continuation of Ser. No. 353,807, May 18, 1989, abandoned, which is a continuation of Ser. No. 924,837, Oct. 29, 1986, abandoned.

[51] Int. Cl.$^5$ .............................................. G01N 29/00
[52] U.S. Cl. ...................................... 73/597; 73/612; 73/168; 137/554
[58] Field of Search .................. 73/119 A, 168, 572, 73/597, 593, 570, 584, 627, 612, 610; 137/554; 340/870.28, 870.30; 367/93, 99, 245, 252

[56] References Cited

U.S. PATENT DOCUMENTS

| | | | |
|---|---|---|---|
| 3,602,254 | 8/1971 | Fawkes | 137/554 |
| 3,859,619 | 1/1975 | Ishihara | 340/238 |
| 3,896,850 | 7/1975 | Waltrip | 137/554 |
| 3,925,692 | 12/1975 | Leschek et al. | 310/8.7 |

(List continued on next page.)

FOREIGN PATENT DOCUMENTS

| | | |
|---|---|---|
| 1153114 | 8/1983 | Canada . |
| 0017365 | 6/1983 | European Pat. Off. . |
| 0287299 | 10/1988 | European Pat. Off. . |
| 3730940 | 3/1989 | Fed. Rep. of Germany . |
| 2478255 | 3/1980 | France ................ 137/554 |

(List continued on next page.)

OTHER PUBLICATIONS

Haynes, H. D., "Evaluation of Check Valve Monitoring Methods," Paper presented at the 17th Water Reactor Safety Meeting, Oct. 23-25, 1989.

Haynes, H. D., "Recent Improvements in Check Valve Monitoring Methods," Proceedings of the 18th Water

(List continued on next page.)

Primary Examiner—Jerry W. Myracle

[57] ABSTRACT

Integrated check valve testing system includes a method and apparatus for non-intrusively testing a check valve which includes using an ultrasonic transducer externally connected to the check valve to direct ultrasonic sound waves through the check valve casting and through the transported fluid to the check valve disk to then detect the ultrasonic sound waves reflected off of the check valve disk. An ultrasonic controller controls the ultrasonic transducer and generates location signals based on the amount of time between each direction of an ultrasonic sound wave and the resulting reception of a reflected ultrasonic sound wave. A system controller analyzes the movement of the check valve disk and calculates certain test data which is compared to previously obtained baseline data. The preferred embodiment of the present invention also includes using two accelerometers externally connected to the check valve to monitor acoustic emissions generated by the check valve. The accelerometers generate emission signals and communicate them to the system controller. These emission signals are analyzed, and data is generated and compared to previously obtained baseline data. Both the ultrasonic transducer and the accelerometers are used separately and simultaneously to verify that the check valve is travelling through a complete stroke and to calculate other test data based on both types of signals which is compared to previously obtained baseline data.

28 Claims, 5 Drawing Sheets

U.S. PATENT DOCUMENTS

| | | | |
|---|---|---|---|
| 4,069,433 | 1/1978 | McShane | 310/32.5 |
| 4,437,473 | 3/1984 | Mollan | 128/773 |
| 4,523,286 | 6/1985 | Koga et al. | 364/494 |
| 4,542,074 | 6/1984 | Shelomentsev et al. | 73/119 A |
| 4,542,652 | 9/1985 | Reuter et al. | 73/597 |
| 4,543,649 | 9/1985 | Head et al. | 367/96 |
| 4,571,994 | 2/1986 | Dickey et al. | 73/168 |
| 4,618,824 | 10/1986 | Magee et al. | 324/208 |
| 4,648,425 | 3/1987 | Watanabe et al. | 137/557 |
| 4,704,906 | 11/1987 | Churchill et al. | 73/660 |
| 4,705,459 | 11/1987 | Buisine et al. | 417/53 |
| 4,737,774 | 4/1988 | Chapman et al. | 340/573 |
| 4,777,979 | 10/1988 | Twerdochlib | 137/554 |
| 4,823,807 | 4/1989 | Russell et al. | 128/773 |
| 4,836,218 | 6/1989 | Gay et al. | 128/773 |
| 4,920,802 | 5/1990 | McMullin et al. | 73/597 |
| 5,008,841 | 4/1991 | McElroy | 364/551.01 |

FOREIGN PATENT DOCUMENTS

| | | | |
|---|---|---|---|
| 56-89072 | 7/1981 | Japan | 367/99 |
| 58-77679 | 5/1983 | Japan | 367/99 |
| 60-46478 | 3/1985 | Japan | 367/99 |
| 60-89783 | 5/1985 | Japan | 367/99 |
| 222707 | 11/1985 | Japan | 73/627 |
| 60-236078 | 11/1985 | Japan | 367/99 |
| 63-110774 | 7/1988 | Japan | |
| WO89/05938 | 6/1989 | PCT Int'l Appl. | |
| 0928948 | 6/1963 | United Kingdom | 73/572 |
| 1525720 | 9/1978 | United Kingdom | 369/99 |

OTHER PUBLICATIONS

Reactor Safety Information Meeting, Oct. 22-24, 1990.

"Acoustic Monitoring of Power Plant Valves," EPRI Proj 1246-1, Final Rpt NP-2444, Jun. 1982.

Collier, S. L., Hoerner, C. C., "A Facility and Approach to Performance Test of Check Valves," Trans of the ASME, Jour of Energy Resources Tech, Mar. 1983, vol. 105, pp. 62-67.

"Application Guidelines for Check Valves in Nuclear Power Plants," EPRI Proj 2233-20, Final Rpt No. NP-5479, Jan. 1988.

Haynes, H. D., Eissenberg, D. M., "Performance Monitoring of Swing Check Valves Using Magnetic Flux Signature Analysis," May 1989.

INTEGRATED CHECK VALVE TESTING SYSTEM

CROSS-REFERENCES TO RELATED APPLICATIONS

This application is a continuation in part of application Ser. No. 07/597,441, filed Oct. 15, 1990, now abandoned which is a continuation of application Ser. No. 07/467,911, filed Jan. 22, 1990, now U.S. Pat. No. 4,977,778, which is a continuation of application Ser. No. 07/353,807, filed May 18, 1989, now abandoned, which is a continuation of application Ser. No. 06/924,837, filed Oct. 29, 1986, now abandoned.

BACKGROUND OF THE INVENTION

The present invention relates generally to the field of testing valves, and more specifically, to the field of non-intrusively testing of check valves.

Valves have been used for years to control the flow and pressure of fluids through conduits. A check valve is a type of one-way, self-actuating valve used to permit fluid flow in only one direction. A check valve normally includes a check valve disk located within a check valve chamber and movable between a backstop and a seat. As fluid flows in the allowed direction, the valve is opened by the force of the flowing fluid. However, as the fluid stops flowing or attempts to reverse and flow in the opposite direction, a properly operating check valve closes. Several common types of check valves include swing check, piston lift, ball, stop check, and duo check.

Check valves are often used in environments where a reversal of flow would be very damaging or dangerous. Failures of check valves have even been known to produce the extremely harmful rises in pressure known as water hammers. Because all of the elements of a check valve are normally located inside the valve chamber, the condition of a check valve is very difficult to monitor. Potentially hazardous conditions may go undetected for extended periods of time. To test a check valve, an operator normally must disassemble the valve to verify operability and inspect each element for degradation and wear to predict future operability. This process is very time consuming and costly. Furthermore, the operator may unknowingly fail to properly reconstruct the valve after inspection, thus creating additional, undetected problems.

Ideally, while fluid flows through a check valve, the check valve disk remains firmly positioned against the backstop of the check valve, thus reducing wear and degradation of the check valve elements. However, it is well-known in the industry that undersized valves, oversized valves, and turbulent conditions in the fluid can result in the check valve disk moving from this position. These conditions often lead to continual damaging impacts between the check valve disk and the backstop or the seat. They also contribute to the check valve disk "fluttering" back and forth in the fluid which also tends to degrade the check valve. Before the invention of the method and apparatus of U.S. Pat. No. 4,977,778, from which this invention claims priority, there were not practical methods in the prior art to non-intrusively check for these harmful movements.

SUMMARY OF THE INVENTION

Briefly described, the present invention includes an integrated check valve testing system which teaches a method and an apparatus for non-intrusively testing the condition of a check valve. The preferred embodiment of the present invention includes using an ultrasonic transducer externally connected to the check valve to direct ultrasonic sound waves through the check valve casting and through the transported fluid to the check valve disk. The ultrasonic transducer then detects the ultrasonic sound waves reflected off of the check valve disk. An ultrasonic controller controls the ultrasonic transducer and generates location signals based on the amount of time between each direction of an ultrasonic sound wave and the resulting reception of a reflected ultrasonic sound wave. These location signals are communicated to a system controller which analyzes the movement of the check valve disk and calculates test data which is compared to previously obtained baseline data.

The preferred embodiment of the present invention also includes using two accelerometers externally connected to the check valve to monitor acoustic emissions generated by the check valve. As the acceleromoters detect acoustic emissions, the accelerometers generate representative emission signals and communicate them to the system controller. These emission signals are analyzed, and data is generated and compared to previously obtained baseline data.

Both ultrasonic and acoustic technologies are used as part of the present, integrated, invented method and apparatus to verify that the check valve is travelling through a complete stroke and to calculate other test data based on both types of signals. This test data is also compared to previously obtained baseline data.

It is therefore an object of the present invention to provide an integrated check valve testing system to test and assist in analysis of the condition of check valve components without requiring physical inspection of the valve components nor requiring back flow of fluid.

Another object of the present invention is to provide an integrated check valve testing method and apparatus for determining if a check valve is in an inoperative condition.

Yet another object of the present invention is to provide an integrated check valve testing method and apparatus for determining if a check valve is still operable yet being subject to damaging operating conditions.

Still another object of the present invention is to provide an integrated check valve testing method and apparatus for monitoring both the movement of a check valve disk and the acoustic emissions of a check valve.

Other objects, features and advantages of the present invention will become apparent upon reading and understanding the present specification, when taken in conjunction with the accompanying drawings.

DETAILED DESCRIPTION OF THE PREFERRED EMBODIMENT

Figure 1:
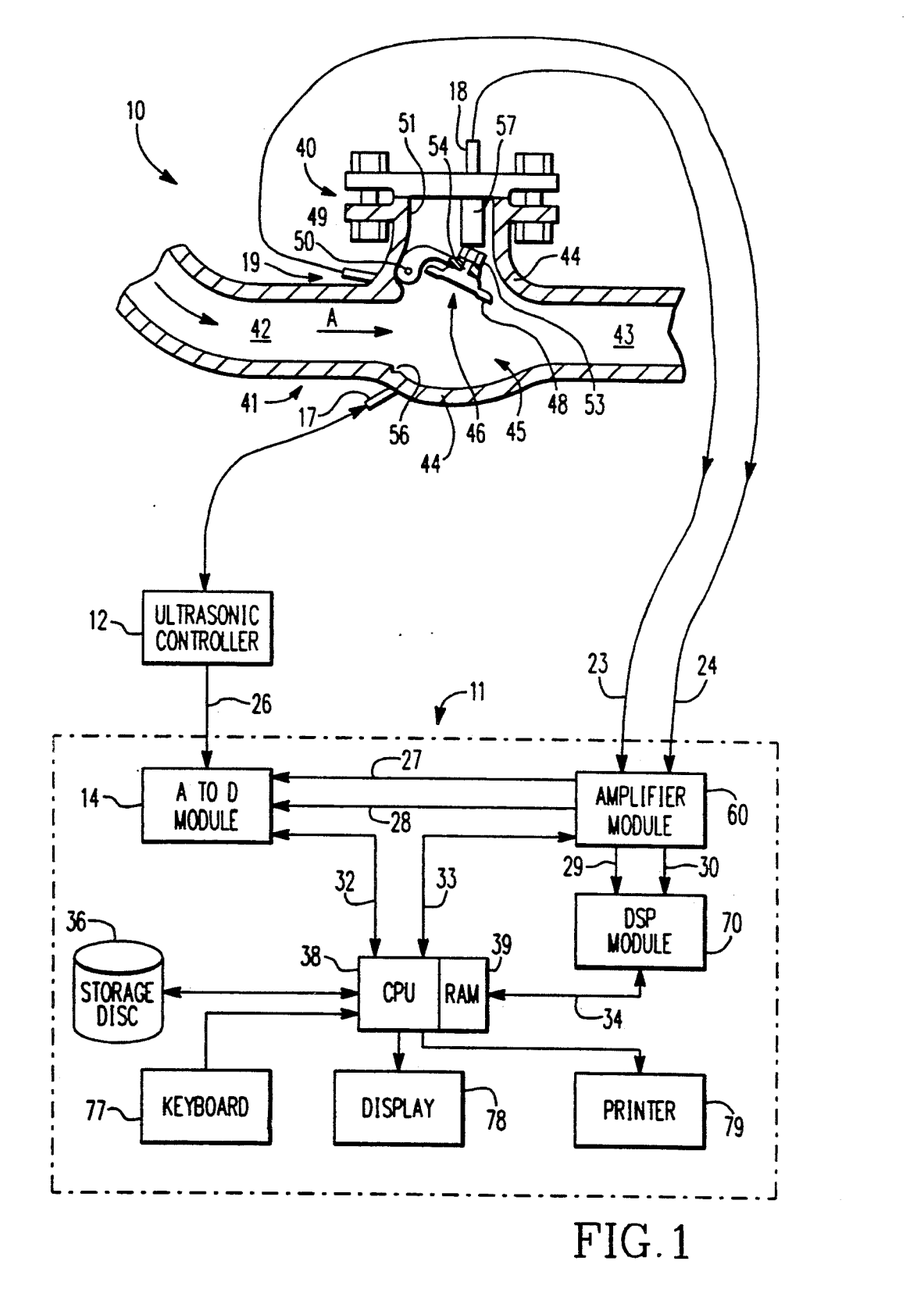
FIG. 1 is a block diagram representation of the integrated check valve testing system, in accordance with the preferred embodiment of the present invention, and showing a cut-a-way, side view of a check valve tested by the present invention.

Referring now in greater detail to the drawings in which like numerals represent like components throughout the several views, the integrated check valve testing system 10 is seen in FIG. 1 connected to check valve assembly 40. Integrated check valve testing system 10 is shown including backstop accelerometer 18, hinge pin accelerometer 19, ultrasonic transducer 17, (referred to collectively as the "sensors") ultrasonic controller 12, system controller 11, and connecting cables 22, 23, 24, and 26. Backstop accelerometer 18 is seen connected to system controller 11 by backstop cable 23, and hinge pin accelerometer 19 is seen connected to system controller 11 by hinge pin cable 24. Ultrasonic transducer 17 is connected to ultrasonic controller 12 by transducer cable 22, and ultrasonic controller 12 is connected to system controller 11 by location cable 26.

System controller 11 is represented by a block diagram in FIG. 1. In the preferred embodiment, amplifier module 60, A-to-D module 14, and DSP module 70 are integrated circuit boards attached within a personal computer which also includes storage disc 36, keyboard 77, display 78, and printer 79. Keyboard 77, display 78, and printer 79 enable the user to interact with system controller 11. It should be understood that other common elements of a personal computer may be included in system controller 11 while not actually being shown in FIG. 1. Amplifier module 60 is shown connected to CPU 38 through amplifier carrier 33. CPU 38 is seen including CPU RAM 39. The cables and carriers represented in FIG. 1 are understood to include one or more conductors capable of carrying one or more different types of signals, including analog wave-forms, digital signals, power signals, and control signals. Amplifier module 60 is also connected to DSP module 70 through backstop amplifier cable 29 and hinge pin amplifier cable 30. Furthermore, amplifier module 60 is shown connected to A-to-D module 14 through backstop RMS cable 27 and hinge pin RMS cable 28. A-to-D module 14 is connected to CPU 38 through A-to-D carrier 32, and DSP module 70 is connected to CPU 38 through DSP carrier 34. Standard controller elements are also connected to CPU 38 and include printer 79, display 78, keyboard 77, and storage disc 36.

Check valve assembly 40 comprises a fluid conduit 41 providing for the normal free flow of fluid from an inlet 42, in the direction of arrows A, to an outlet 43. Between the inlet 42 and outlet 43 of the fluid conduit 41 is a valve chamber 45 formed from valve casting 44 which houses a swinging disk assembly 46. The swinging disk assembly 46 comprises a valve disk 48 mounted to a hinge arm 49, which hinge arm 49 is pivotally connected at hinge pin 50 which is mounted to the inner wall 51 of the valve chamber 45. In some embodiments of the swinging disk assembly 46, the valve disk 48 and hinge arm 49 are forged as one component. In other embodiments, similar to that shown in FIG. 1, the valve disk 48 is bolted to the hinge arm 49 by a stud nut 53 bolted to a threaded stud 54 protruding upward from the disk 48. The check valve assembly 40 further includes valve seat 56 and backstop 57. In other embodiments, inner wall 51 of the valve chamber 45 serves as a backstop. Although check valve assembly 40 is represented as a swing check valve, it should be understood that integrated check valve testing system 10 is equipped to test various other types of check valves.

The integrated check valve testing system 10 is set-up, in the field, at the location of the check valve assembly 40 along the fluid conduit system. In its preferred embodiment, integrated check valve testing system 10 employs the two technologies of ultrasonics and acoustics to test check valve assembly 40.

In the preferred embodiment, ultrasonic technology is employed through ultrasonic transducer 17 and ultrasonic controller 12. One example of an acceptable ultrasonic controller 12 is a modified flaw detection scope SP03113-QC400 available from Staveley Instruments of Kennewick, WA. In operation, ultrasonic controller 12 generates electrical pulses at an ultrasonic frequency and supplies them through transducer cable 22 to ultrasonic transducer 17 which converts the electrical pulses into ultrasonic sound waves. The frequency of the generated pulses is set sufficiently high to assure transmission of the sound waves through the different mediums of the valve casting 44, fluids, and any other materials associated with the valve assembly 40. One example of an acceptable range of frequencies is 1-5 Mega- Hertz. Ultrasonic transducer 17 sends an electrical signal back through transducer cable 22 to ultrasonic controller 12 as it receives reflected sound waves from check valve assembly 40.

The user attaches ultrasonic transducer 17 to valve casting 44 so as to direct ultrasonic sound waves at valve disk 48 within valve chamber 45. In the preferred embodiment, ultrasonic transducer 17 operates in the pulse-echo mode; therefore, it must also be placed so as to most effectively receive waves reflected off of valve disk 48 during its swing between backstop 57 and valve seat 56. The geometry of the check valve assembly 40 often makes the placement of ultrasonic transducer 17 a very tedious matter. Furthermore, some embodiments of check valve assembly 40 have geometries such that ultrasonic transducer 17 cannot receive reflected waves throughout the entire swing of valve disk 48. In alternate embodiments of the present invention, additional ultrasonic transducers 17 are used to receive waves throughout the entire swing of valve disk 48. Also, the use of combinations of ultrasonic transducers 17 in the pitch-catch mode is considered within the scope of the present invention. Examples of alternate placements of ultrasonic transducers 17 are shown in U.S. Pat. No. 4,977,778. The specification of U.S. Pat. No. 4,977,778 is incorporated herein by reference.

As ultrasonic controller 12 sends a pulse through transducer cable 22, a counter within ultrasonic controller 12 is started which counts the amount of time until a signal which represents the sound wave reflected off of valve disk 48 is received. This wave reflected off of the valve disk 48 shall be referred to as the "disk wave" in this disclosure. Because sound waves are sent through valve casting 44, ultrasonic transducer 17 typically receives a host of other reflected waves in addition to the disk wave. These additional reflected waves, denoted in this disclosure as "noise", are normally due to the transducer/casting interface, the inner wall/fluid interface, and other interfaces associated with the check valve assembly 40. To properly identify the disk wave, ultrasonic controller 12 employs at least two discriminating functions.

A first function involves the assumption that most of the noise occurs within a first standard amount of time. By ignoring all signals received within a first amount of time, ultrasonic controller 12 eliminates a large amount of noise from consideration. In the preferred embodiment, this standard delay is manually controlled by the user. A second function involves the assumption that the amplitudes of the noise waves are normally lower than the amplitude of the disk wave. By ignoring all signals with amplitudes below a certain predetermined level, ultrasonic controller 12 eliminates another large amount of noise. This gate level is also manually controlled by the user in the preferred embodiment.

After the disk wave is received, ultrasonic controller 12 converts the amount of time into a distance signal which represents the distance between ultrasonic transducer 17 and valve disk 48. The user inputs into ultrasonic controller 12 the speed at which sound travels through the valve casting 44 to assist ultrasonic controller 12 in making this calculation. In the preferred embodiment, a visual indication of this distance is displayed on ultrasonic controller 12. This distance signal is also supplied to system controller 11 through location cable 26 as an analog DC signal. One example of an acceptable distance-to-voltage ratio is 10 inch = 1 volt. As each new pulse is generated by ultrasonic controller 12 at the predetermined ultrasonic frequency, new distances are calculated in response to the time lapse until each disk wave is received. Thus the analog DC signals on location cable 26 continually vary as valve disk 48 swings within valve chamber 45.

Location cable 26 supplies these analog signals to A-to-D module 14 within system controller 11. A-to-D module 14 converts the analog signals into digital output signals. According to commands from CPU 38, these digital signals are supplied through A-to-D carrier 32 to CPU 38. The digital location signals are then processed by CPU 38 to be stored on storage disc 36 along with the results of certain calculations and comparisons, as is discussed in detail below.

The preferred embodiment of the present invention also employs the technology of acoustics. In the preferred embodiment, the user attaches backstop accelerometer 18 and hinge pin accelerometer 19 to valve casting 44 near backstop 57 and hinge pin 50, respectively. In the preferred embodiment, accelerometers 18 and 19 are attached so that they are oriented 90 degrees apart for better sensitivity. It should be understood that alternate placements and orientations of backstop accelerometer 18 and hinge pin accelerometer 19, as well as the use of fewer or additional accelerometers, is considered within the scope of the present invention.

Acoustic emissions, also known as pressure waves or vibrations, are generated, among other times, when solids contact each other and when liquids flow through fittings. When valve seat 56 or backstop 57 are struck by elements of swinging disk assembly 46, acoustic emissions are generated. Similarly, when elements such as hinge pin 50 or threaded stud 54 become worn so that parts of check valve assembly 40 become lose and rattle, acoustic emissions are generated. Furthermore, if any fluid leaks through check valve assembly 40 when the flow of fluid is reversed, acoustic emissions are generated. These emissions are detected by backstop accelerometer 18 and hinge pin accelerometer 19, which generate signals in response to the detected emissions. These signals are supplied through backstop cable 23 and hinge pin cable 24, respectively, to system controller 11. In this embodiment, backstop cable 23 and hinge pin cable 24 each include at least two conductors. Similarly, backstop RMS cable 27, hinge pin RMS cable 28, backstop amplifier cable 29, and hinge pin amplifier cable 30 all include at least two conductors.

Figure 2:
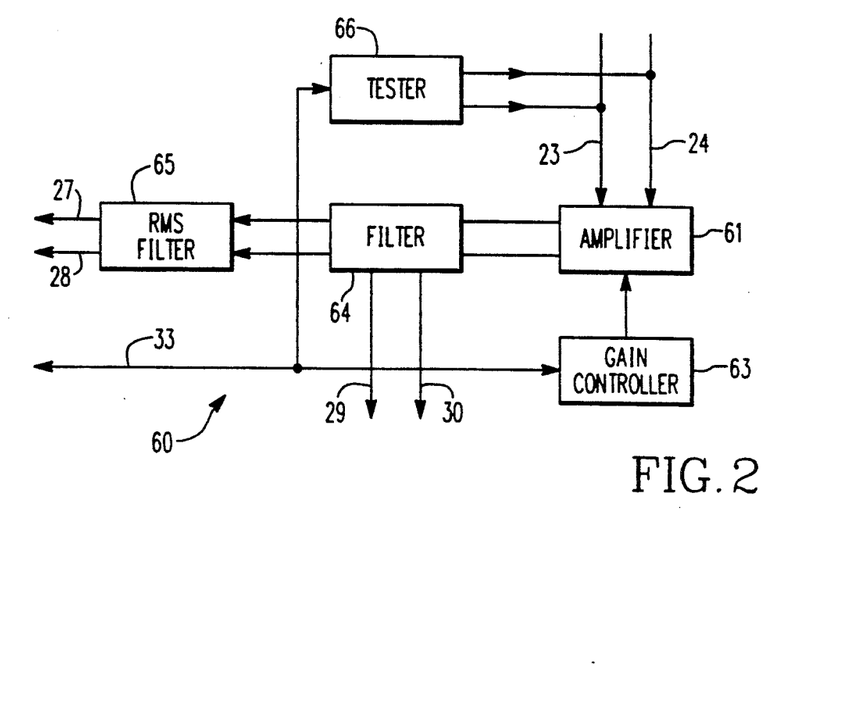
FIG. 2 is a block diagram representation of the amplifier module of FIG. 1.

Amplifier module 60 performs several functions as it receives these signals from backstop accelerometer 18 and hinge pin accelerometer 19. A more detailed block diagram representation of amplifier module 60 is shown in FIG. 2. Referring now to FIG. 2, amplifier 61 amplifies signals received through backstop cable 23 and hinge pin cable 24 and supplies the amplified output to filter 64. Gain controller 63, in response to control signals received through amplifier carrier 33 from CPU 38, (shown in FIG. 1), controls the amount of amplification given to these signals by amplifier 61. Filter 64 filters these amplified signals and supplies the filtered signals to RMS converter 65 and to backstop amplifier cable 29 and hinge pin amplifier cable 30 which are connected to DSP module 70 (shown in FIG. 1). RMS converter 65 converts the signals from filter 64 into real time RMS (root mean square) signals which are output onto backstop RMS cable 27 and hinge pin cable 28. An RMS value of a time domain acoustic emission signal is one of the most relevant measures of the signal's amplitude. The RMS value takes into consideration the time history of the signal and provides a value which is directly related to the signal's actual energy content. Tester 66 is also seen connected to amplifier carrier 33 and backstop cable 23 and hinge pin cable 24. Tester 66, as controlled through amplifier carrier 33, generates test wave signals and supplies the signals to amplifier 61. This is one way the present invention tests itself.

Referring back to FIG. 1, the RMS signals carried on backstop RMS cable 27 and hinge pin RMS cable 28 are converted into digital representations of those analog signals by A-to-D module 14. Those digital representations are then supplied to CPU 38 through A-to-D carrier 32 upon request from CPU 38. In the preferred embodiment of the present invention, these signals are used to detect the effective noise level of check valve assembly 40 during back-flow conditions when the flow of fluid through the valve is reversed. This process is described in greater detail below.

Figure 3:
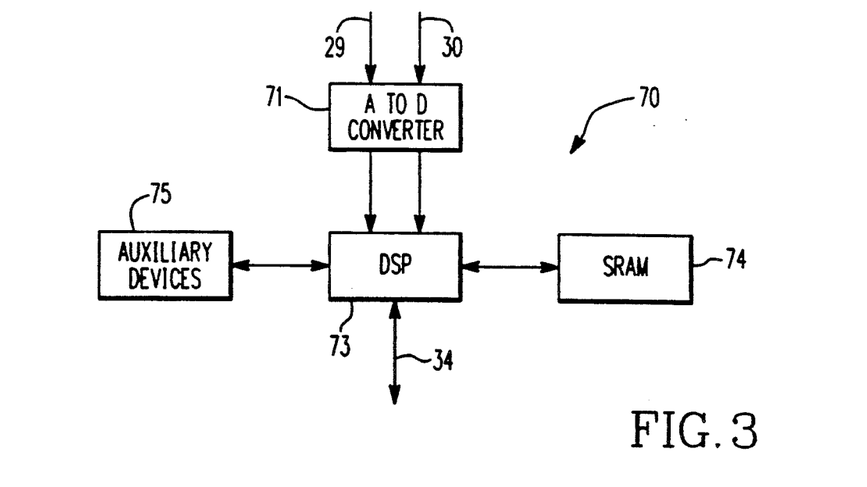
FIG. 3 is a block diagram representation of the DSP module of FIG. 1.

DSP module 70 is seen receiving signals from amplifier module 60 through backstop amplifier cable 29 and hinge pin amplifier cable 30. A more detailed block diagram representation of DSP module 70 is seen in FIG. 3. One example of an acceptable DSP module 70 is the MCM-DSP32C from Winsystems of Arlington, TX. Referring now to FIG. 3, backstop amplifier cable 29 and hinge pin amplifier cable 30 are seen connected to A-to-D converter 71, which supplies digital representations of the amplified signals to DSP 73. DSP 73 (digital signal processor) is a programmable integrated circuit with internal memory which processes digital signals. One example of an acceptable DSP 73 is the DSP32C from AT&T Microelectronics of Allentown, Pa. Working in conjunction with auxiliary devices 75 and SRAM 74 (static random access memory), DSP 73 processes the digital signals received from A-to-D converter 71. The results of this processing are supplied through DSP carrier 34 to CPU 38 (shown in FIG. 1). The real-time calculations performed by DSP 73 are discussed in greater detail below.

Figure 4:
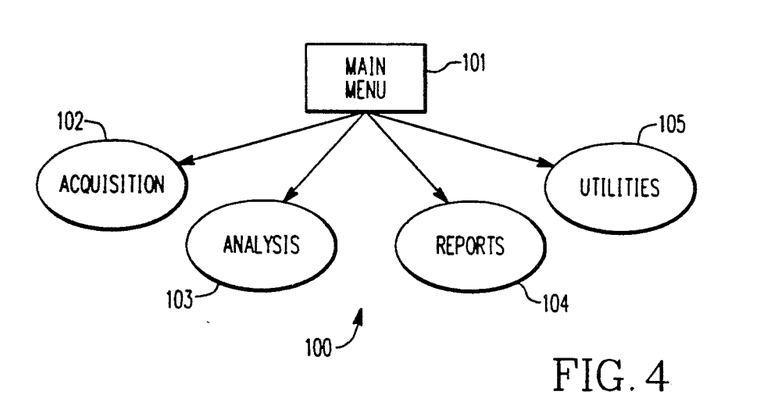
FIG. 4 is a high level flow chart representation of the control program of the system controller shown in FIG. 1.

Referring back to FIG. 1, CPU 38 receives data from A-to-D module 14 and DSP module 70 as discussed above. CPU 38 further processes and stores this data according to control programs stored on storage disc 36. FIG. 4 shows a high level flow chart representation of the preferred embodiment of the control program 100 of system controller 11. Referring now to FIG. 4, control program 100 begins by displaying a main menu, as indicated by step 101. The options of the main menu are shown as acquisition option 102, analysis option 103, reports option 104, and utilities option 105.

To gather text data by running various tests on check valve assembly 40, (shown in FIG. 1), the user chooses acquisition option 102, to perform the acquisition method, which is discussed in detail below in conjunction with FIG. 5. To perform various calculations and comparisons using data acquired under acquisition option 102, the user chooses analysis option 103 to perform the analysis method, which is discussed in detail below in conjunction with FIG. 6. The reports option 104 is chosen by the user to produce reports on printer 79 (shown in FIG. 1). The reports generally show the results of acquisition option 102 and analysis option 103. In addition, weighted calculations which combine the results of both the acoustic and ultrasonic components of acquisition option 102 and analysis option 103 are also performed by CPU 38 to give overall valve condition results. Finally, the user chooses the utilities option 105 to set configuration parameters of system controller 11 which relate to disc drives, display colors, help functions, and other utility functions.

Figure 5:
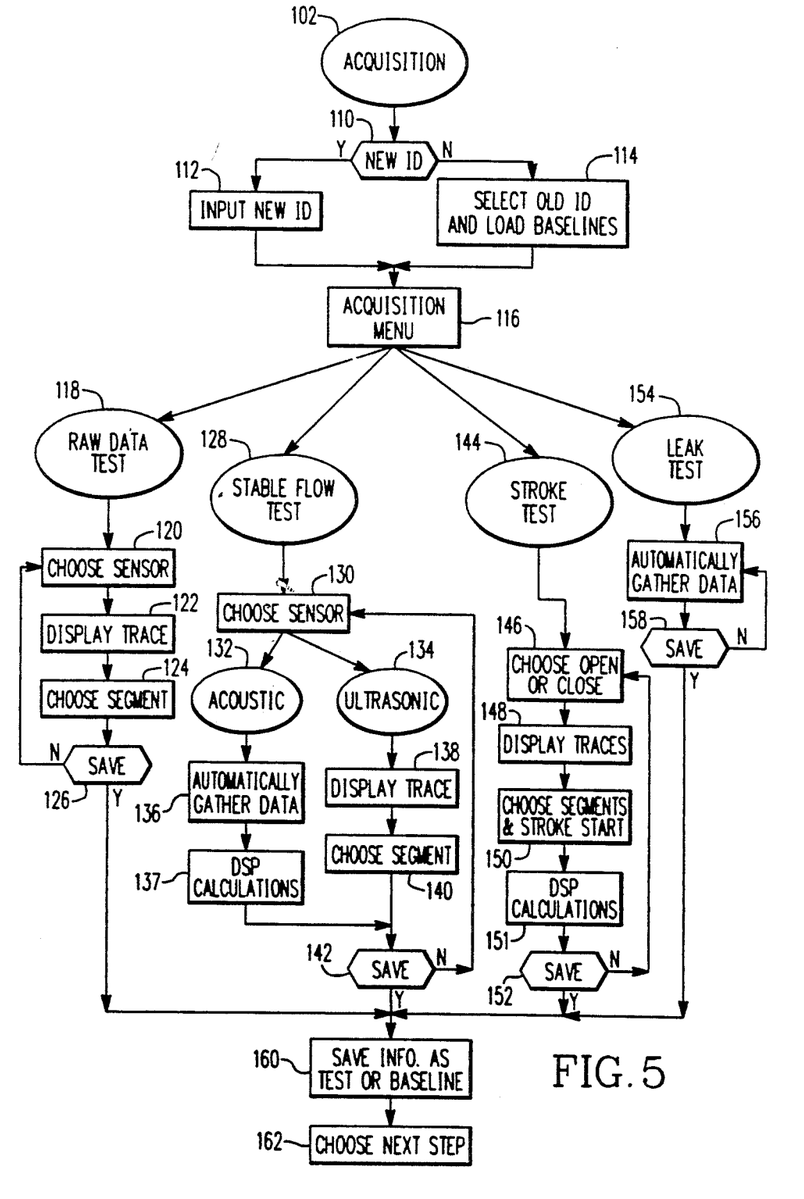
FIG. 5 is a flow chart representation of the steps taken during the acquisition method.
Figure 6:
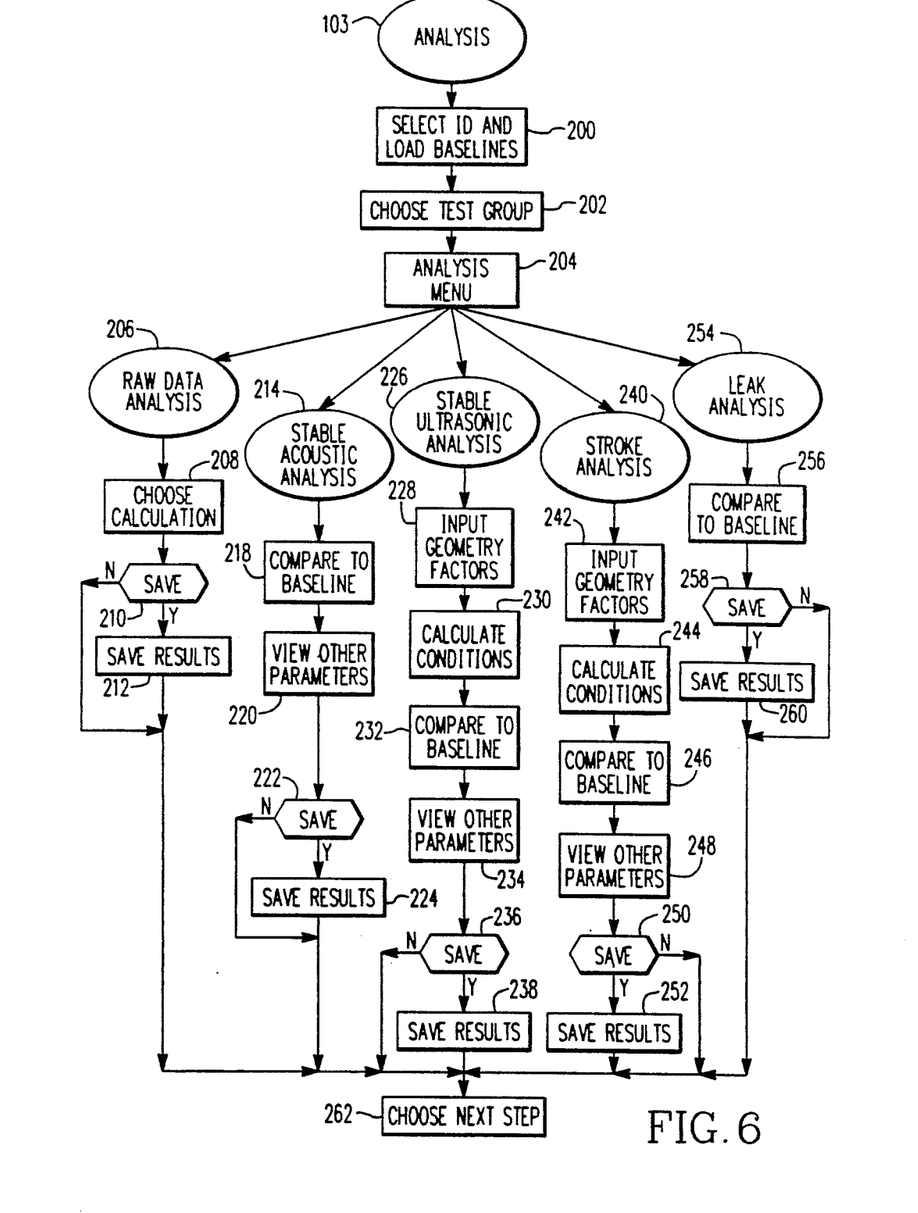
FIG. 6 is a flow chart representation of the steps taken during the analysis method.

It should be understood that the order and combination of steps disclosed in conjunction with FIGS. 4-6 define the preferred embodiment of the present invention and that the steps may be rearranged, steps may be deleted, and steps may be added in alternate embodiments within the scope of the present invention. Furthermore, in alternate embodiments, one or more steps shown within the analysis procedure in FIG. 6 are performed as the data is acquired.

Refer now to FIG. 5 for reference to the steps of the acquisition method and to FIG. 1 for reference to the apparatus elements of the present invention. After acquisition option 102 is selected, system controller 11 requests the user to identify the current check valve assembly 40 by entering a new check valve identification number (ID) or picking from a list of ID's which represent previously tested check valve assemblies 40, as indicated by decision block 110 and steps 112 and 114. If the user picks an existing check valve ID from this list, step 114 indicates that the available baselines are then loaded into CPU RAM 39 (Random Access Memory) from storage disc 36. Baselines are the results of previous tests and analyses performed on that particular check valve assembly 40 which were designated as baseline data. Baselines represent results to which subsequent test results are compared.

After the check valve assembly 40 is identified, an acquisition menu provides the user a choice of available tests, as indicated by step 116. If the user chooses the raw data test, the method proceeds down the path as indicated by raw data test option 118. Step 120 indicates that the user is then prompted for the particular type of sensor or combination of sensors to be used to collect the raw data. The options include an acoustic test using backstop accelerometer 18 and hinge pin accelerometer 19, an ultrasonic test using ultrasonic transducer 17, or a combination of both of these tests. After the user selects the desired sensor, system controller 11 begins graphically displaying on display 78 a trace which is representative of the signals received from the appropriate sensor or combination of sensors. DSP module 70 converts the amplified acoustic emission signals received from amplifier module 60 into digital data and passes the information straight through without performing any complex calculations on the data, as are discussed below in conjunction with the stable flow and stroke procedures.

After system controller 11 begins displaying this graphical data, the user is given the ability to stop the test, thereby selecting the most recent segment of data, as indicated by step 124. In the preferred embodiment, a "segment of data" corresponds to the amount of data gathered during a predetermined amount of time. If the user decides not to save this segment of data the (N)o branch of decision block 126 is taken back to step 120. However, if the user chooses to save this segment of data, the (Y)es branch of decision block 126 is taken to step 160. At this point, the user enters appropriate test identification information which, among other things, identifies this test as a baseline test or a subsequent trending test. This information also includes comments, date, and time information. After this information is entered, the data is saved on storage disc 36 along with other system-provided information such as the valve ID and the type of test performed. Finally, the user is given an option as to how the method should continue, as indicated by step 162. In the preferred embodiment, program flow may be directed back to acquisition menu 116, to the analysis procedure, or back to the main menu. If the data is identified as baseline information, there may be no need to provide the user with an option to proceed to the analysis section.

Returning now to the acquisition menu, represented by step 116, if the user chooses the stable flow test, the method proceeds down the path as indicated below option 128. This test is intended to be used during steady state conditions when fluid is supplied normally through check valve assembly 40. As with the raw data test, the user is prompted to choose a sensor or combination of sensors at step 130. However, in the preferred embodiment, the combination of both accelerometers and ultrasonic transducer is not an option in the stable flow test because of the difference in the two procedures, as is discussed below. In alternate embodiments, combining both types of sensors in the stable flow test is an option.

If ultrasonic transducer 17 is chosen, option 34 is taken. The following steps are very similar to those associated with the raw data test using ultrasonic transducer 17. Step 138 indicates that the trace is again displayed on display 78 until the user stops the acquisition, thereby selecting the preceding segment of data. If the user decides not to save this segment of data, the (N)o branch of decision block 142 is taken back to step 130. However, if the user chooses to save this segment of data, the (Y)es branch of decision block 42 is taken to steps 160 and 162, which have been described above.

However, if accelerometers 18 & 19 are chosen at step 130, the ensuing steps are very different from the acoustic analysis performed in the raw data test. Step 136 indicates that system controller 11 begins automatically gathering data from accelerometers 18 and 19 for a certain predetermined amount of time, referred to herein as the acoustic stable time. In the preferred embodiment of the present invention, the acoustic stable time is 4 minutes.

DSP module 70 then receives the amplified acoustic emission signals from amplifier module 60 and processes, utilizing previously programmed known mathematical formulas, a comprehensive set of real time complex calculations on the signals, as indicated by step 137. In the preferred embodiment, at least the following stable parameters are calculated for the acoustic stable time: 1) Impact rate, 2) overall RMS noise level, 3) Average RMS of impacts, 4) Average Power Spectral Density (PSD) of impacts, and 5) Average Conjugate Power Spectral Density (CPSD) of impacts. The significance of these calculations is discussed in detail below. These results are then communicated to CPU 38 through DSP carrier 34. In the preferred embodiment, only the results of these calculations, rather than the large amount of raw data gathered over the relatively lengthy acoustic stable time, are saved on storage disc 36 if step 160 is chosen after this test. However, it should be understood that the saving of all of the data is also within the scope of the present invention.

Returning again to the acquisition menu, represented by step 116, if the user chooses the stroke test, the method proceeds down the path as indicated below option 144. This test incorporates, in the preferred embodiment, both ultrasonic and acoustic technologies and is designed to be conducted when the flow of fluid through fluid conduit 41 is started from a no-flow condition or slowed from a full-flow condition so that swinging disk assembly 46 is caused to swing through a stroke. Step 146 indicates that the user is first prompted to indicate through which type of stroke the swinging disk assembly 46 will be caused to move, ie., an opening or a closing. As indicated by step 148, all three traces (2 accelerometer traces and 1 ultrasonic trace) will then begin appearing on display 78. When the user determines that the stroke is complete, step 150 indicates that the user stops the test, thereby choosing the preceding segments of data for each trace in a manner similar to the previously discussed raw data acquisition method.

Figure 7:
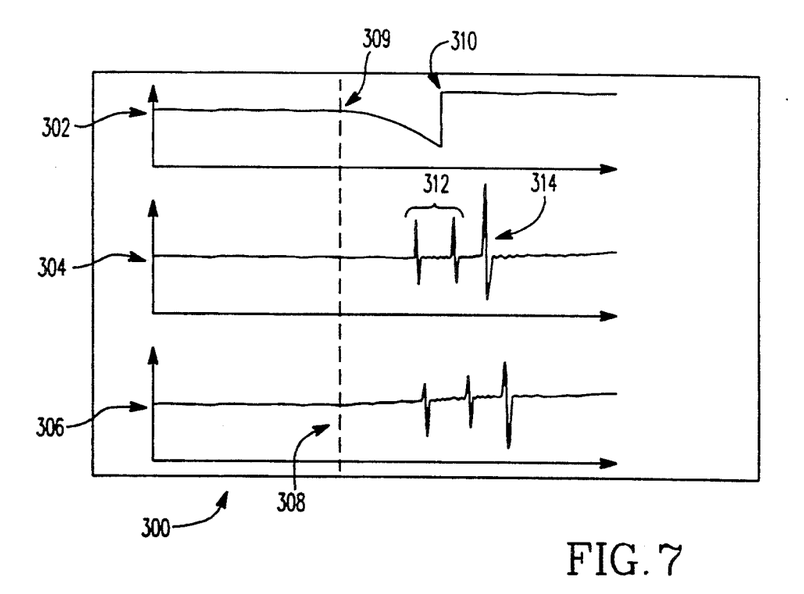
FIG. 7 is a display of stroke traces.

As discussed above, some embodiments of check valve assembly 40 define structures such that one stationary ultrasonic transducer 17 cannot detect an entire swing of swinging disk assembly 46. By displaying all three traces, the present invention enables the user to verify that the swinging disk assembly 46 is stroking through complete strokes. Refer now to FIG. 7, in addition to FIGS. 1 and 5. FIG. 7 shows one example of a display showing all three traces after the user has halted the acquisition, thus choosing a segment. Stroke trace display 300 is seen including ultrasonic trace 302, hinge pin trace 304, backstop trace 306, user cursor 308, stroke beginning point 309, no-detect point 310, precursors 312, and main impact 314. Ultrasonic trace 302 indicates that valve disk 48 begins the stroke at stroke beginning point 309 and continues moving at least until no-detect point 310, at which time valve disk 48 can no longer be detected by ultrasonic transducer 17 because of the geometry of check valve assembly 40. By then referring to hinge pin trace 304 which indicates main impact point 314, the user can verify that valve disk 48 has travelled through a complete stroke. Furthermore, backstop trace 306 indicates similar points which are slightly delayed, in the closing stroke, due to vibration propagation delay through valve casting 44.

Because swinging disk assembly 46 may only generate relatively minor and potentially unnoticeable acoustic emissions as it begins a stroke, the user positions ultrasonic transducer 17 to sense the beginning of the stroke. Depending on which type of stroke is being tested, backstop accelerometer 18 or hinge pin accelerometer 19 is used to sense the end of the stroke because the main impact with backstop 47 or valve seat 56 normally causes a very noticeable acoustic emission. By observing the traces of both acoustic and ultrasonic sensors, the user is unobtrusively verifying that check valve assembly 40 is functioning properly.

Besides providing the user with the ability to verify operability, the present invention also provides the user with detailed wear information which enables the user to predict future operability. The user, through viewing the traces displayed on display 78 and using keyboard 77 to move user cursor 308 across display 78, manually identifies the stroke beginning point 309, as indicated by step 150 and shown in FIG. 7. Other methods of identifying the stroke beginning, such as automatically analyzing the ultrasonic data without the use of display 78, are also considered within the scope of the present invention.

Once stroke beginning point 309 is identified, the acoustic trace data gathered after this point is sent back to DSP module 70, which calculates, using previously programmed, known mathematical formulas, a set of stroke parameters, as indicated by step 151. These parameters include, at least: 1) Number of precursor impacts during the stroke period, 2) RMS noise level of the stroke period, 3) Average RMS of precursors, 4) Magnitude of the main impact, 5) Stroke time, 6) Average Power Spectral Density (PSD) of the precursors, and 7) PSD of the main impact. The stroke period is defined as the time between stroke beginning point 309 and main impact 314. During the stroke period, there are normally several slight impacts, referred to herein as "precursors", and shown in FIG. 7 as precursors 312. These slight impacts are usually due to rattling between elements of check valve assembly 40, such as that between hinge pin 50 and hinge arm 49. The significance of the acquisition of this information is discussed in detail below.

The results of the calculations are then communicated to CPU 38 through DSP carrier 34. In this preferred embodiment, decision block 152 gives the user the option of saving the results of the DSP calculations and a lower resolution representation of the segments of trace data previously identified by the user. If the user decides not to save this segment of data, the (N)o branch of decision block 152 is taken back to step 146. However, if the user chooses to save this data, the (Y)es branch of decision block 152 is taken to steps 160 and 162, which have been described above.

Returning for a final time to the acquisition menu, represented by step 116, if the user chooses the leak test, the method proceeds down the path as indicated below option 154. In the preferred embodiment, this test incorporates only the acoustic technology and is designed to be conducted when the flow of fluid through fluid conduit 41 is reversed so that check valve assembly 40 closes to prevent reverse flow. Step 156 indicates that acoustic data is automatically gathered for a predetermined amount of time, equivalent to 3-5 minutes in the preferred embodiment. As the weak signals enter amplifier module 60, from the accelerometers 18 and 19, amplifier module 60 calculates real time RMS values for each channel and sends the RMS values through backstop RMS cable 27 and hinge pin RMS cable 28 to A-to-D module 14. After conversion, digital representations of these analog RMS signals are supplied to CPU 38 through A-to-D carrier 32.

CPU 38 samples this data to build a distribution curve and calculate the mean and standard deviation of these signals. The significance of these calculations is discussed below. Decision block 158 indicates that the user is once again given the option of saving the results of these calculations. If the user decides not to save this data, the (N)o branch of decision block 158 is taken back to step 156. However, if the user chooses to save this data, the (Y)es branch of decision block 158 is taken to steps 160 and 162, which have been described above.

Refer now to FIG. 6 for reference to the steps of the analysis method and to FIG. 1 for reference to the apparatus elements of the present invention. After the analysis procedure is chosen by the user, the method proceeds down the path below option 103. The user is first prompted to enter the valve identification number (ID) so that all available baseline parameters are loaded into CPU RAM 39, as indicated by step 200. Step 202 indicates that the user is then given the opportunity to choose a particular test group for analysis from a list of test groups saved on storage disc 36. A test group is a file storage structure which connects, in name, the results of several data acquisition tests performed on the same occasion on the same check valve. The analysis menu is then presented to the user so that the particular type of analysis may be chosen, as indicated by step 204. In this preferred embodiment, if the user has chosen the analysis procedure directly from step 162 of the acquisition procedure (shown in FIG. 5), steps 200-204 are omitted. It is assumed that the user wishes to analyze the most recently acquired data.

If the user chooses the raw data analysis, the method proceeds down the path below option 206. This analysis allows the user to request system controller 11 to perform a number of pre-programmed calculations on previously acquired raw data. This raw data is loaded from storage disc 36 into CPU RAM 39 if it isn't already loaded. If DSP 70 is required for the calculations, data is sent to DSP 70 through DSP carrier 34, and the results are returned and displayed. The list of calculations include, at least, calculating RMS noise levels, average RMS levels of impacts, and average PSD's. Other raw data editing functions are also available. If the user chooses to save the results of this analysis, the (Y)es branch of decision block 210 is taken to step 212 which indicates that the results are saved on storage disc 36. If the user does not choose to save these results, the (N)o branch is taken to skip step 212. Regardless of whether the results are saved, the user then chooses the next step in the process, as indicated by step 262.

If the user chooses the stable acoustic analysis, the method proceeds down the path below option 214. This analysis allows the user to analyze the results of the acoustic stable flow test described above in conjunction with FIG. 5. In the preferred embodiment of the present invention, there are at least two different methods of analyzing acquired data. The first method involves automatically comparing parameters calculated from the data against baseline parameters, as indicated by step 218. The second method involves directly analyzing the data or the results of calculations performed on the data, as indicated by step 220. By simply viewing these results or by viewing the data directly, the user can discover inoperability or signs of wear.

In the preferred embodiment, step 218 represents comparing at least the Impact rate, RMS noise level, and Average RMS of impacts with corresponding baseline parameters. Step 220 represents viewing at least the Average Power Spectral Density (PSD) of impacts, and the result of the Average Conjugate Power Spectral Density (CPSD) of impacts.

The overall RMS noise level is a parameter which indicates the effective intensity of the acoustic emissions from check valve assembly 40 generated throughout the acoustic stable time. This parameter provides an overall indication of the noise level of check valve assembly 40. The acoustic emissions which contribute to this level may be generated by a variety of sources including impacts and rattling of elements such as hinge arm 49 and valve disk 48, as well as main impacts between valve disk 48 and backstop 57 or valve seat 56. In the preferred embodiment, if the overall RMS noise level is greater than 3 times the baseline overall RMS noise level or less than .25 times the baseline overall RMS noise level, an alarm is generated.

The impact rate is the rate at which impacts occur during the acoustic stable time. To define impacts, the acoustic data is broken into a large number of small blocks of data. An impact is then defined to have occurred when the RMS level of a small block of data exceeds a threshold value. This threshold value is defined as the product of the overall RMS noise level and a predetermined constant. This rate provides the user a basis for determining whether there are any dangerous check valve conditions, such as turbulence in the fluid flow, an oversized valve, an undersized valve, or loose valve parts. By comparing this parameter with the baseline impact rate parameter for this check valve, the present invention indicates whether this parameter has increased beyond an unacceptable level. In the preferred embodiment, an alarm is generated by CPU 38 if the impact rate is greater than twice the baseline impact rate or if the impact rate is greater than 100 impacts per minute.

The Average RMS of impacts is a parameter which indicates the average of the RMS levels of the impacts. This value provides an indication of the mass of swinging disk assembly 46 and the average energy involved in the impacts. In the preferred embodiment, if the Average RMS of impacts 1.5 times the baseline, an alarm is generated.

The Average Power Spectral Density (PSD) of impacts is a parameter representative of an average Fourier transform of each impact. In the present embodiment, this graphical parameter is not automatically compared to a baseline, but is generated to be viewed by the user and manually compared, through graphical overlays, to a baseline to determine various frequency characteristics of the impacts, such as indications of the remaining effective mass of swinging disk assembly 46. However, it is within the scope of the present invention to automatically compare this parameter with a baseline parameter.

The Average Conjugate Power Spectral Density (CPSD) of impacts is calculated to indicate which accelerometer first receives the majority of the impacts during the acoustic stable time. This information provides a good indication of the source of the impacts. Hinge pin accelerometer 19 will be the first accelerometer to detect any rattling in swinging disk assembly 46 and an impact between valve disk 48 and valve seat 56. The backstop accelerometer 18 will be the first accelerometer to detect an impact between swinging disk assembly 48 and backstop 57.

After these parameters are analyzed, the results of the analysis may be saved, as indicated by decision block 222 and step 224. These function similarly to those considered during the raw data analysis.

If the user chooses the stable ultrasonic analysis, the method proceeds down the path below option 226. This analysis allows the user to analyze the data gathered during the stable flow ultrasonic acquisition discussed above with respect to FIG. 5. Step 228 indicates that the user is prompted to enter geometry factors which are used by CPU 38 in conjunction with known geometrical formulas to calculate ultrasonic test parameters. Hinge pin 50 is defined as the Origin for distances and angles. In the preferred embodiment, these geometry factors include, at least: X and Y coordinates of ultrasonic transducer 17, orientation angles of ultrasonic transducer 17, valve temperature, thickness of valve casting 44, thickness of valve disk 48, orientation of check valve assembly 40, type of check valve assembly 40 (swing, tilt, or duo), actual flow rate, and the angle formed by valve seat 56.

In the preferred embodiment, these factors are used by CPU 38 to calculate at least two ultrasonic test parameters: the average angle from horizontal formed by valve disk 48 (referred to herein as the "opening angle"), and the average angular velocity of valve disk 48 throughout the test segment of time (referred to herein as the "stability number"). The average opening angle indicates the average relative position of valve disk 48 during stable flow conditions. The user is therefore able to detect whether the valve is opening to a normal position. When compared to the baseline condition, as indicated by step 232, an alarm is generated if the angle changes by more than 4 degrees from the baseline.

The stability number is very instrumental in determining how much wear check valve assembly 40 is experiencing. The higher the stability number, the more check valve assembly 40 is degrading. Alternately, if the stability number falls, the swinging disk assembly 46 may be dangerously binding. In the preferred embodiment, if the stability number increases by more than 2 plus the baseline condition, an alarm is generated. Step 234 indicates that the user is also given the opportunity to view other ultrasonic parameters which are not automatically compared to baseline condition in the preferred embodiment, such as the total amount of movement throughout the test segment of time. Finally, decision block 236 and step 238 give the user the opportunity to save the results of this analysis in a manner similar to that discussed above.

If the user chooses the stroke analysis, the method proceeds down the path below option 240. This analysis allows the user to analyze the data gathered during the stroke acquisition which utilized both acoustic and ultrasonic technology as discussed above with respect to FIG. 5. Step 242 indicates that the user is prompted to enter geometry factors which are used in the analysis. These factors are very similar to those entered for the stable ultrasonic analysis and are used in similar calculations, the results of which may be viewed according to step 248. In the preferred embodiment, the parameters which are compared to baselines are the: number of precursor impacts before the main impact, RMS noise level during the stroke period, and average RMS of precursors. The magnitude of the main impact, stroke time, average PSD of the precursors, and PSD of the main impact are all parameters which, in the preferred embodiment, are not automatically compared to baselines, but are viewable as indicated by step 248. In alternate embodiments, these parameters are automatically compared to baselines. In addition to the acoustic components of these parameters, they possess an ultrasonic component by virtue of their dependance on the definition of a stroke period.

During acquisition, the number of precursors is calculated. The technique of detecting precursors is similar to that discussed above regarding the detection of impacts. The number of precursors is another indication of the condition of check valve assembly 40. In the preferred embodiment, an alarm is generated if this number increases by more than 1 over the baseline parameter. The RMS noise level during the stroke period and the average RMS of the precursors are also calculated during acquisition. These calculations are also similar to those discussed above regarding the overall RMS noise level and the average RMS of impacts. In the preferred embodiment, if the RMS noise level during the stroke period is greater than twice the baseline or less than 0.25 times the baseline, an alarm is generated. If the average RMS of precursors is greater than twice the baseline, an alarm is generated. Finally, decision block 250 and step 252 give the user the opportunity to save the results of this analysis in a manner similar to that discussed above.

If the user chooses the leak analysis, the method proceeds down the path below option 254. This analysis allows the user to analyze the data gathered during the leak test acquisition as discussed above with respect to FIG. 5. Step 254 indicates that the mean and standard deviation of the distribution curve generated during acquisition are compared to the baseline parameters. The size of a leak corresponds to the amount of noise generated. In the preferred embodiment, if the mean is greater than the baseline mean plus twice the baseline standard deviation, an alarm is generated. Finally, decision block 250 and step 252 give the user the opportunity to save the results of this analysis in a manner similar to that discussed above.

It is important to note that in alternate embodiments, other values besides the ones disclosed in this specification are used in the comparisons to determine whether an alarm is generated. Different environments enable certain parameters to vary more (or less) with respect to baselines in generating alarms.

Furthermore, the present invention includes compiling the results of several baseline comparisons of both acoustic and ultrasonic tests to arrive at an overall condition. During this compiling process, the results are assigned different weights so that some of the parameters are valued more highly than others. For example, the result of the stability number comparison to baseline may be given a value which is twice as important as the value assigned to the RMS of impacts comparison to baseline. This process is included under the reports option 104 of FIG. 4 in the preferred embodiment. However, this process is included as another analysis option in an alternate embodiment.

Also, in a broader scope of the present invention, one of object of the invention is to combine acoustic emission monitoring with non-intrusive, valve disk location monitoring. In fulfillment of this scope, alternate methods of sensing the location of the valve disk are included. The implementation of these alternate methods are considered apparent upon reading the above description.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. Method of testing the operating condition of a fluid flow check valve including a movable check valve disk positioned in a check valve chamber defined by a check valve casting, said method comprising the steps of:
   directing a sound wave at and through the check valve casting and at the check valve disk;
   receiving a reflected sound wave reflected off the check valve disk;
   counting the lapsed time from the end of a selected delay, subsequent to the directing of the sound wave, until the receipt of the reflected sound wave;
   repeating the above directing, receiving, and counting steps at selected intervals over a period of time to monitor any relative movement of the check valve disk;
   monitoring acoustic emissions generated by the check valve;
   generating acoustic data representative of the monitored acoustic emissions; and
   analyzing the acoustic data to monitor the operating condition of the check valve.

2. Method of testing a fluid flow check valve, the check valve including a movable check valve disk positioned in a check valve chamber defined by a check valve casting, said method comprising the steps of:
   directing an ultrasonic sound wave at and through a check valve casting and at a check valve disk;
   receiving an ultrasonic reflected sound wave reflected off the check valve disk;
   generating a location signal which represents a relative position of the check valve disk;
   repeating the above directing, receiving, and generating steps throughout a first period of time;
   monitoring acoustic emissions generated by the check valve throughout a second period of time; and
   generating emission signals which represent the monitored acoustic emissions.

3. Method of claim 2, wherein the first period and the second period at least partially overlap in real time, during which overlap ultrasonic sound waves are directed and received while acoustic emissions are simultaneously monitored.

4. Method of claim 3, further comprising the step of analyzing both the location signals and the emission signals to verify that the check valve disk moved through a stroke.

5. Method of claim 3, further comprising the step of analyzing both the location signals and the emission signals to define a stroke period of time during which the check valve disk moves through a stroke.

6. Method of claim 5, further comprising the step of calculating test stroke parameters from the emission signals, the parameters including one or more the following: a number of precursor emissions during the stroke period, an RMS emission level during the stroke period, and an average RMS precursor emission level during the stroke period.

7. Method of claim 6, further comprising the step of comparing the test stroke parameters with baseline stroke parameters.

8. Method of claim 2, wherein the first period defines a period of steady state flow of fluid through the check valve, and further comprising the step of calculating test stable ultrasonic parameters from the location signals, the parameters including one or more of the following: a stable angular velocity and a stable opening angle.

9. Method of claim 8, further comprising the step of comparing the test stable ultrasonic parameters with baseline stable ultrasonic parameters.

10. Method of claim 2, wherein the second period defines a period of steady state flow of fluid through the check valve, and further comprising the step of calculating test stable acoustic parameters from the emission signals, the parameters including one or more of the following: a stable impact rate, a stable RMS emission level, and a stable average RMS impact emission level.

11. Method of claim 10, further comprising the step of comparing the test stable acoustic parameters with baseline stable acoustic parameters.

12. Method of claim 2, wherein the second period defines a period of steady state flow of fluid through the check valve, and further comprising the step of calculating an average impact power spectral density from the emission signals.

13. Method of claim 2, wherein the second period defines a period of steady state flow of fluid through the check valve, wherein acoustic emissions are monitored through a plurality of accelerometers, and further comprising the step of calculating an average impact conjugate power spectral density from the emission signals to indicate which accelerometer of the plurality of accelerometers most likely first monitored the monitored acoustic emissions, thus providing an indication of the location of the acoustic emissions.

14. Method of claim 2, further comprising the steps of reversing fluid flow to close the check valve before acoustic emissions are monitored, and processing the emission signals to calculate a test average leakage emission level.

15. Method of claim 14, further comprising the step of comparing the calculated test average leakage emission level to a baseline average leakage emission level.

16. Method of testing a fluid flow check valve, the check valve including a movable check valve disk positioned in a check valve chamber defined by a check valve casting, said method comprising the steps of:
   removably and temporarily locating a sound wave transducer at a check valve;
   directing an ultrasonic sound wave at and through a check valve casting and at a check valve disk;
   receiving a reflected sound wave reflected off the check valve disk;
   generating a location signal which represents a relative position of the check valve disk;
   repeating the above directing, receiving, and generating steps throughout a first period of time;
   removably and temporarily locating at least one accelerometer at the check valve;
   monitoring acoustic emissions generated by the check valve throughout a second period of time which overlaps, at least partially, with the first period in real time;
   generating emission signals which represent the monitored acoustic emissions;

analyzing both the location signals and the emission signals to define a stroke period of time during which the check valve disk moves through a stroke;

calculating test stroke parameters from the emission signals, the parameters including one or more of the following: a number of precursor emissions during the stroke period, an RMS emission level during the stroke period, and an average RMS precursor emission level during the stroke period; and comparing the test stroke parameters with baseline stroke parameters.

17. Method of testing a fluid flow check valve, the check valve including a movable check valve disk positioned in a check valve chamber defined by a check valve casting, said method comprising the steps of:

removably and temporarily locating a sound wave transducer at a check valve;

directing an ultrasonic sound wave at and through a check valve casting and at a check valve disk;

receiving a reflected sound wave reflected off the check valve disk;

generating a location signal which represents a relative position of the check valve disk;

repeating the above directing, receiving, and generating steps throughout a first period of time during which fluid flows in a steady state through the check valve;

calculating test stable ultrasonic parameters from the location signals, the parameters including one or more of the following: a stable angular velocity and a stable opening angle;

removably and temporarily locating at least one accelerometer at the check valve; monitoring acoustic emissions generated by the check valve throughout a second period of time during which fluid flows in a steady state through the check valve;

generating emission signals which represent the monitored acoustic emissions;

calculating test stable acoustic parameters from the emission signals, the parameters including one or more of the following: a stable impact rate, a stable RMS emission level, and a stable average RMS impact emission level; and calculating overall condition parameters from weighted values of both the test stable ultrasonic parameters and the test stable acoustic parameters.

18. Testing apparatus for testing the operating condition of a check valve, the check valve including a movable check valve disk positioned in a check valve chamber defined by a check valve casting, said apparatus comprising:

transducer means for directing ultrasonic sound waves at and through a check valve casting of a check valve and at a check valve disk, and for receiving reflected ultrasonic sound waves reflected off the check valve disk;

signal conditioning means connected to said transducer means for generating location signals which represent relative positions of the check valve disk within the check valve chamber;

accelerometer means for monitoring acoustic emissions from the check valve and generating emission signals which represent the monitored acoustic emissions;

control means connected to said signal conditioning means and to said accelerometer means for receiving the location signals and the emission signals and for calculating test data from the location signals and the emission signals.

19. Testing apparatus of claim 18, wherein said signal conditioning means includes, at least, a distinguishing means for identifying the reflected ultrasonic sound wave reflected off the check valve disk, said distinguishing means including, at least, a gate means for suppressing signals below a predetermined minimum energy level and a delay means for suppressing signals received within a predetermined initial time period.

20. Testing apparatus of claim 18, wherein said signal conditioning means includes, at least, a timer means for counting the lapsed time between the directing of each ultrasonic wave and the receiving of the resulting reflected wave reflected of the check valve disk.

21. Testing apparatus of claim 20, wherein said signal conditioning means further includes, at least, a distance means connected to said timer means for calculating from each amount of lapsed time and a predetermined, medium specific, sound propagation speed, the relative location of the check valve disk within the check valve chamber.

22. Testing apparatus of claim 18, wherein said accelerometer means includes, at least, a plurality of accelerometers.

23. Testing apparatus of claim 18, wherein the location signals generated by said signal conditioning means define analog signals, and wherein said control means includes, at least, an analog-to-digital means for converting the analog location signals into digital location signals.

24. Testing apparatus of claim 18, wherein the emission signals generated by said accelerometer means define weak analog emission signals, and wherein said control means includes, at least, an amplifier means for amplifying the weak analog emission signals and producing strong analog emission signals.

25. Testing apparatus of claim 24, wherein said control means further includes, at least, an analog-to-digital means connected to said amplifier means for converting the strong analog emission signals into digital emission signals.

26. Testing apparatus of claim 25, wherein said control means further includes, at least, a digital signal processing means connected to said analog-to-digital means for processing the digital emission signals.

27. Testing apparatus of claim 18, wherein said control means further includes, at least, a central processing unit connected to a digital storage device.

28. Testing apparatus for testing the operating condition of a check valve, the check valve including a movable check valve disk positioned in a check valve chamber defined by a check valve casting, said apparatus comprising:

transducer means for directing ultrasonic sound waves at and through a check valve casting of a check valve and at a check valve disk, and for receiving reflected ultrasonic sound waves reflected off the check valve disk;

signal conditioning means connected to said transducer means for generating analog location signals which represent relative positions of the check valve disk within the check valve chamber, said signal conditioning means including, at least, a distinguishing means for identifying the reflected ultrasonic sound wave reflected off the check valve disk, said distinguishing means including, at least,
- a gate means for suppressing signals below a predetermined minimum energy level and
- a delay means for suppressing signals received within a predetermined initial time period, a timer means for counting the lapsed time between the directing of each ultrasonic wave and the receiving of the resulting reflected wave reflected of the check valve disk, and a distance means connected to said timer means for calculating from each amount of lapsed time and from a predetermined, medium specific, sound propagation speed, the relative location of the check valve disk within the check valve chamber;

accelerometer means for monitoring acoustic emissions from the check valve and generating weak emission signals which represent the monitored acoustic emissions, said accelerometer means including, at least, a plurality of accelerometers;

control means connected to said signal conditioning means and to said accelerometer means for receiving the location signals and the emission signals and for calculating test data from the location signals and the emission signals, said control means including, at least,
- a location analog-to-digital means for converting the analog location signals into digital location signals,
- an amplifier means for amplifying the weak analog emission signals and producing strong analog emission signals,
- an emission analog-to-digital means connected to said amplifier means for converting the strong analog emission signals into digital emission signals,
- a digital signal processing means connected to said emission analog-to-digital means for processing the digital emission signals, and
- a central processing unit connected to a digital storage device.

* * * * *